UNITED STATES PATENT OFFICE.

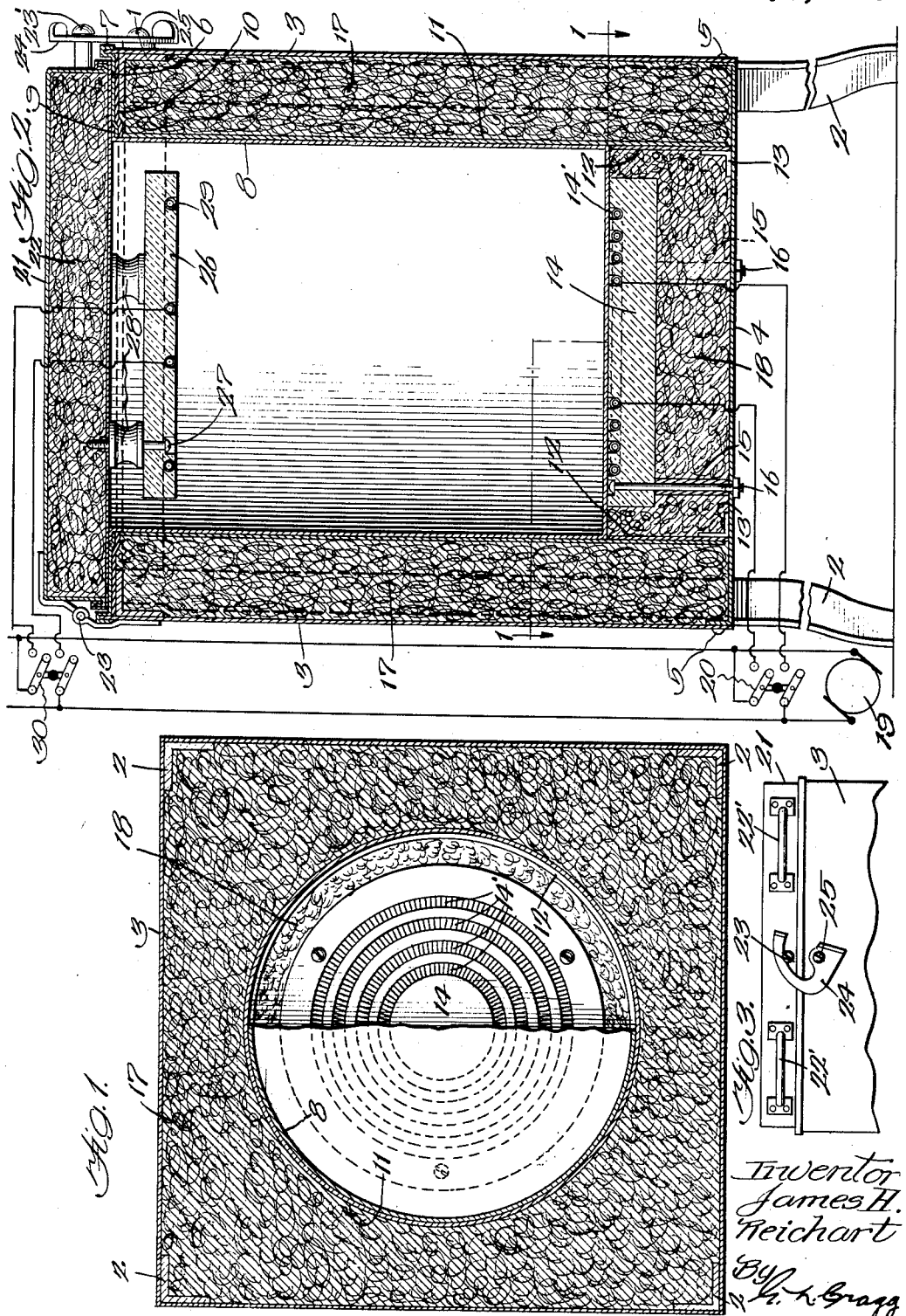

JAMES H. REICHART, OF MUNCIE, INDIANA, ASSIGNOR TO THE STEROLECTRIC COMPANY, OF MUNCIE, INDIANA, A CORPORATION OF INDIANA.

FIRELESS COOKER.

1,415,049.   Specification of Letters Patent.   Patented May 9, 1922.

Application filed October 7, 1920. Serial No. 415,378.

*To all whom it may concern:*

Be it known that I, JAMES H. REICHART, citizen of the United States, residing at Muncie, in the county of Delaware and State of Indiana, have invented a certain new and useful Improvement in Fireless Cookers, of which the following is a full, clear, concise, and exact description.

My invention relates to stoves of the class known as fireless cookers and has a number of objects and advantages in view.

In accordance with one characteristic of my invention a heat storage device such as a body of porcelain is disposed at or against the exterior of a wall, preferably the bottom wall, of the well of the cooker and is embedded within the asbestos wool or other heat insulating material that is disposed between the well and the outside casing of the cooker to avoid conduction of heat from the well to the exterior of the cooker. By disposing the heat storage device upon the exterior of the well rather than within it, the well space is kept clear for the reception of contents that are to be cooked, together with the containers for these contents, while at the same time the heat within the heat storage device is more effectively conserved. Owing to the location of the heat storage device mentioned it is more practical to heat the same electrically rather than to provide a construction permitting of its insertion and removal for heating.

In accordance with another characteristic of my invention, a heating unit is placed within the upper portion of the well for the purpose of browning food being cooked and also to heat the top portion of the well, it being found that heat from the bottom heating unit is not evenly distributed throughout the well. For the sake of convenience the top heating unit is mounted upon the lid of the cooker so as to be out of the way when food is being passed into or taken from the well. As it would be difficult to remove and relocate the top heating unit, I desirably electrically heat the same as well as the bottom heating unit. The invention is not to be limited, however, to the electrical heating of these heating devices.

The invention has other characteristics and will be fully explained in connection with the accompanying drawing showing the preferred embodiment thereof and in which Fig. 1 is a sectional plan view with parts broken away, taken generally on line 1—1 of Fig. 2; Fig. 2 is a sectional elevation of the cooker; and Fig. 3 is a front view of the top portion of the cooker on a smaller scale.

Like parts are indicated by similar characters of reference throughout the different figures.

The structure illustrated employs a top framework 1 for the body portion of the cooker and four legs 2 secured at their upper ends to said framework. This frame and its legs are preferably formed of angle iron. The exterior walls 3 of the casing may be formed of sheet metal secured to the frame 1 and the legs 2 and enclosing these parts. The bottom wall 4 of the cooker, also desirably of sheet metal, is removably secured to the side walls 3 by screws 5. The top wall 6, also preferably of sheet metal, is shaped to form a grooved bordering rim 7, into the groove of which the top edges of the walls 3 are received. A large circular opening is formed in the top wall 6 to receive the cylindrical well 8 which is desirably made of sheet metal, this well being bordered by a rim 9 received within a depression formed in the top wall 6 and bordering the opening in the well, whereby the top surface of this rim and the top surface of the wall 6 are in substantially the same horizontal level. A layer of heat insulation 10 is interposed between the frame 1 and the top wall 6, this frame supporting the top wall through the intermediation of said layer 10. In order to prevent the well from sagging, the wall 6, which extends inwardly beyond the frame 1, preferably takes no material part in supporting the well, this function being performed by a cylindrical positioner 11 that may be formed of sheet metal and in which the well is snugly received. This cylindrical positioner, in turn, encloses another cylindrical positioner 12, that may be of metal, for itself, this positioner 12 being assembled with the bottom 4 of the cooker through the intermediation of angular clips 13 that are secured to the positioner 12 and the bottom wall 4 of the cooker casing. The elements 11 and 12 serve to preserve the alignment of the well 8 while the well is kept in its proper zone preferably by means of the heating unit 14 which is secured to the bottom wall 4 and is maintained in suitable spaced apart relation therefrom by the distance preserving sleeves 15 through which the bolts 16 are passed that serve to assemble the heating unit 14 with the bottom wall 4. By this construction the sagging of the well is prevented when it is filled with food that is to be cooked, although when the well is empty the frame structure 1 and the top wall 6 together with the layer of insulation 10 are sufficient to hold the well in its zone so that the wall 4, the heating unit 14 assembled therewith, together with the positioner 12 and clips 13, may be removed when the screws 5 are displaced. The heating unit 14 thus not only serves as a support for the well but also is in direct contact with the exterior of the bottom side thereof readily to convey heat to the interior of the well. The space confined by the border portion of the wall 4, the frame 1, the layer of insulation 10, the side walls 3, and the cylindrical positioner 11 is filled by a body of heat insulating material 17 which is preferably asbestos wool. The space confined by the balance of the bottom wall 4, the bottom wall of the well and the cylindrical positioner 12 is similarly filled with another body of heat insulating material 18 also preferably asbestos wool.

The cooker, as it has been thus far described, is seen to be composed of two separable members, one, the well member that includes the well 8, its positioner 11, the body of heat insulating material 17, the side walls 3, the top wall 6, the frame 1, and the supporting legs 2. The other member may be termed the heating unit member, comprising as it does the assembled heating unit 14, the bottom wall 4 in supporting relation to the heating member that is in turn in supporting relation to the well and the positioner 12 that is in nesting engagement with the positioner 11 to position the well. In practice these two members of the cooker are desirably normally permanently assembled on which account the heating unit 14 is normally not removable. Such being the case, this heating unit is preferably electrically heated though it is to be understood that I do not limit myself to the manner in which this unit is heated nor to the fact that it is normally not removable. If this unit is electrically heated it is made of suitable material such as porcelain to which heat may be imparted from the heating resistance coils 14' suitably imbedded within grooves formed in the top surface of the heating element and adapted for inclusion in circuit with a source of current 19 by any suitable switching means such as the switch 20.

The top of the cooker may be provided with any suitable form of closure. The closure illustrated includes a casing 21 whose top, bottom and sides are preferably formed of sheet metal that enclose a body of heat insulating material 22 desirably formed of asbestos wool. The closure or lid thus formed preferably is joined by hinges 23 with the body of the cooker. The lower portion of this lid is received in the space surrounded by the rim 7, this rim serving to prevent the overflow of liquid that may come upon the top wall 6. The lid is desirably provided with two handles 22' whereby it may readily be swung upon its hinges and also carries a headed post 23 for engaging the eccentric or cam-shaped catch 24 pivotally mounted at 25 upon the body of the cooker. By means of this cam-shaped catch the bottom of the lid may be firmly pressed upon the top wall 6 of the cooker body to seal the well of the cooker against the outflow of steam and vapor. I desirably provide a second heating unit 26 within the upper portion of the well where it is provided with a suitable support which is desirably the lid of the cooker in order that this heating unit may be automatically removed from the well when the lid of the cooker is displaced to permit of the passage of food into or from the well. I do not limit myself, however, to this manner of removably mounting the upper heating unit 26. As illustrated, the heating unit 26 is assembled with the bottom side of the lid through the intermediation of bolts 27 passing through the heating unit 26 into threaded connection with the bottom metallic portion of the lid, distance preserving sleeves 28 being clamped between the heating unit 26 and the lid by the bolts 27. If the heating unit 26 is preferably assembled with the lid, it is then desirably electrically heated in which case it may be made of porcelain suitably grooved to receive the resistance coils 29 that are adapted to be included in circuit with the source of current 19 by any suitable switching means such as the switch 30. Either or both of the heating units 14, 26 may be heated and this heating may be accomplished while the food to be cooked is within the well and while the cooker is closed. In this way the cooking process may commence just as soon as the storage of heat in the heating units is begun whereby the cooking process is expedited.

The features of fireless cookers now on the market are well known to those skilled in the art and need not therefore be enlarged upon herein. The advantages in the cooker of my invention over prior devices will be readily understood by those familiar with the subject.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A fireless cooker having an element shaped to form a well and located within the body portion of the cooker; a positioner for the well element assembled with the side portions of the cooker body; and a positioner for the aforesaid positioner assembled with the bottom of the cooker body which, together with the positioner assembled therewith, is separable from the balance of the structure.

2. A fireless cooker having an element shaped to form a well and located within the body portion of the cooker; a positioner for the well element assembled with the side portions of the cooker body; a positioner for the aforesaid positioner assembled with the bottom of the cooker body which, together with the positioner assembled therewith, is separable from the balance of the structure; and a heating unit below the well element and also assembled with the bottom of the cooker body to be removable therewith.

3. A fireless cooker having an element shaped to form a well and located within the body portion of the cooker; a positioner for the well element assembled with the side portions of the cooker body; a positioner for the aforesaid positioner assembled with the bottom of the cooker body which, together with the positioner assembled therewith, is separable from the balance of the structure; and a heating unit below and in supporting relation to the well element and also assembled with the bottom of the cooker body to be removable therewith.

4. A fireless cooker having an element shaped to form a well and located within the body portion of the cooker; and a heating unit below the well element and assembled with the bottom of the cooker body that is separably assembled with the balance of the cooker.

5. A fireless cooker having an element shaped to form a well and located within the body portion of the cooker; and a heating unit below and in supporting relation to the well element and assembled with the bottom of the cooker body that is separately assembled with the balance of the cooker.

6. A fireless cooker having an element shaped to form a well and located within the body portion of the cooker; a positioner for the well element assembled with the side portions of the cooker body; a positioner for the aforesaid positioner assembled with the bottom of the cooker body which, together with the positioner assembled therewith, is separable from the balance of the structure; and a heating unit below the well element and also assembled with the bottom of the cooker body to be removable therewith, said heating unit having an electric current conducting resistance for imparting heat thereto.

7. A fireless cooker having an element shaped to form a well and located within the body portion of the cooker; a positioner for the well element assembled with the side portions of the cooker body; a positioner for the aforesaid positioner assembled with the bottom of the cooker body which, together with the positioner assembled therewith, is separable from the balance of the structure; and a heating unit below and in supporting relation to the well element and also assembled with the bottom of the cooker body to be removable therewith, said heating unit having an electric current conducting resistance for imparting heat thereto.

8. A fireless cooker having an element shaped to form a well and located within the body portion of the cooker; and a heating unit below the well element and assembled with the bottom of the cooker body that is separably assembled with the balance of the cooker, said heating unit having an electric current conducting resistance for imparting heat thereto.

9. A fireless cooker having an element shaped to form a well and located within the body portion of the cooker; and a heating unit below and in supporting relation to the well element and assembled with the bottom of the cooker body that is separably assembled with the balance of the cooker, said heating unit having an electric current conducting resistance for imparting heat thereto.

In witness whereof, I hereunto subscribe my name this 1st day of July, A. D. 1920.

JAMES H. REICHART.